Figure 1:
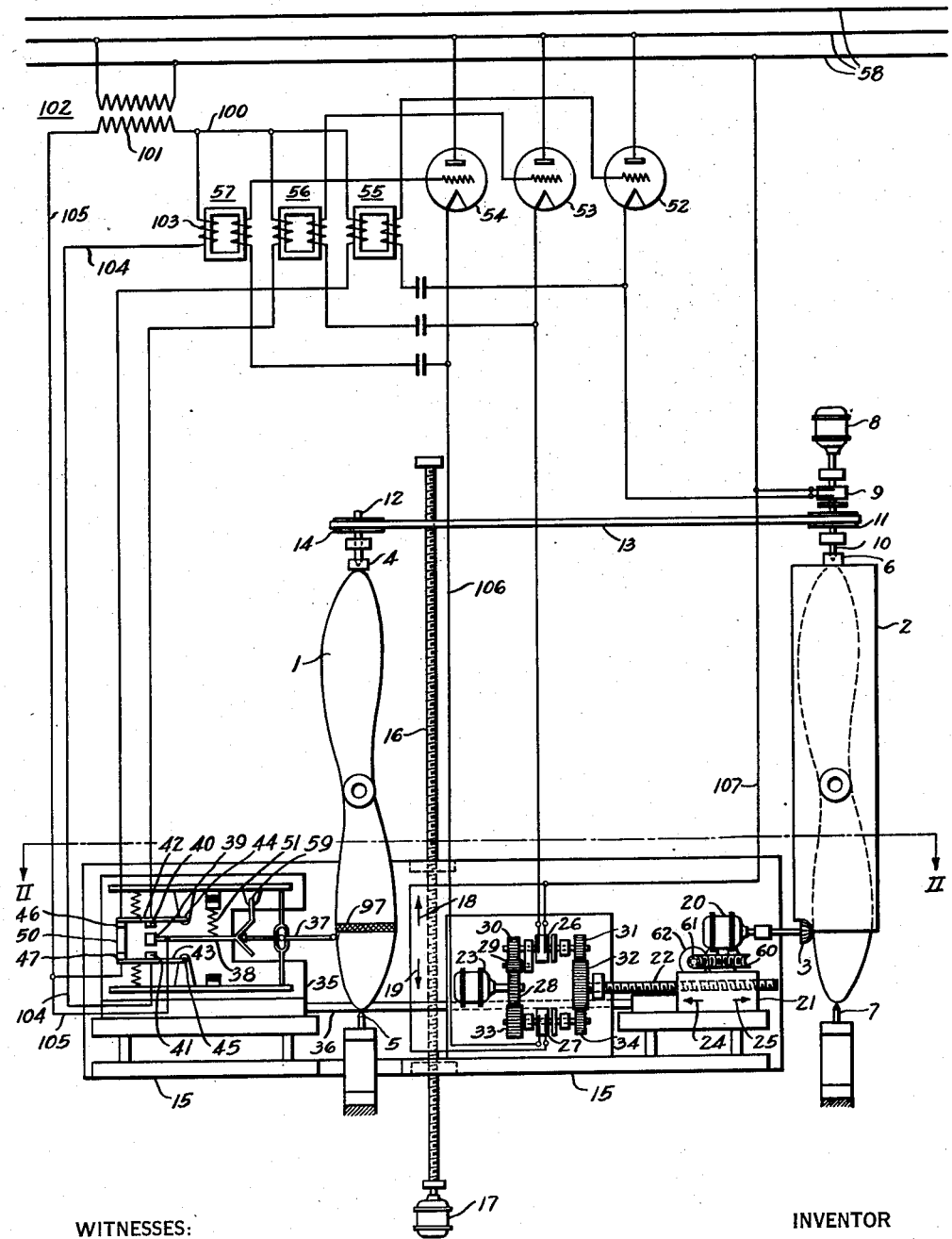

March 28, 1939.   W. CHLADEK   2,151,743
AUTOMATIC CUTTING MACHINE
Filed May 14, 1936   2 Sheets-Sheet 1

WITNESSES:
Michael Stark
Wm. C. Groome

INVENTOR
Wilhelm Chladek.
BY
Paul E. Friedmann
ATTORNEY

March 28, 1939.  W. CHLADEK  2,151,743

AUTOMATIC CUTTING MACHINE

Filed May 14, 1936  2 Sheets-Sheet 2

WITNESSES:
Michael Stark
Nm. C. Groome

INVENTOR
Wilhelm Chladek.
BY
Paul E. Friedemann
ATTORNEY

Patented Mar. 28, 1939

2,151,743

UNITED STATES PATENT OFFICE 2,151,743

AUTOMATIC CUTTING MACHINE

Wilhelm Chladek, Berlin-Pankow, Germany, assignor to Westinghouse Electric & Manufacturing Company, East Pittsburgh, Pa., a corporation of Pennsylvania Application May 14, 1936, Serial No. 79,682
In Germany July 31, 1935

18 Claims. (Cl. 90—13.5)

This invention relates to a system of control for machine tools, and more particularly to a system of control whereby such machines as grinders, milling machines, lathes, planers, etc., may be controlled to automatically produce work pieces by the use of templates, or reproduce work pieces by the use of finished work pieces as templates.

One object of my invention is to automatically produce work pieces by a machine coacting with a template.

Another object of my invention is to provide a system of control for an automatic machine in which the material removing tool shall accurately follow a tracer coacting with a template, a pattern, or with a full-sized model.

It is also an object of my invention to provide a control system that shall be relatively simple in arrangement and will readily coact with the template and the machine, the operation of which is to be controlled.

It is also an object of my invention to provide a system of control for an automatic machine in which the material removing tool accurately follows the movement of a tracer coacting with a template, or model, such follow-up movement of the tool also having a definite relation to the tangent at the point of cooperation of the tracer with the surface of the template, or model.

It is also a still further object of my invention to provide a photo-electric control system that shall be relatively simple in arrangement and will readily coact with the template in such manner that the material removing element of a machine maintains a given relation in space to the template.

A more specific object of my invention is to rotate a full-sized model and a work piece synchronously about parallel axes and to provide a combination of photo-electric means and mechanical means coacting with the model and having movement in the direction of the axes with reference to the model and work piece for controlling a cutting tool, moving with said photo-electric means and mechanical means relative to the work piece, so that its longitudinal axis has a definite relation to the tangent at the point of cooperation of said photo-electric means and mechanical means with the model.

Figure 2:
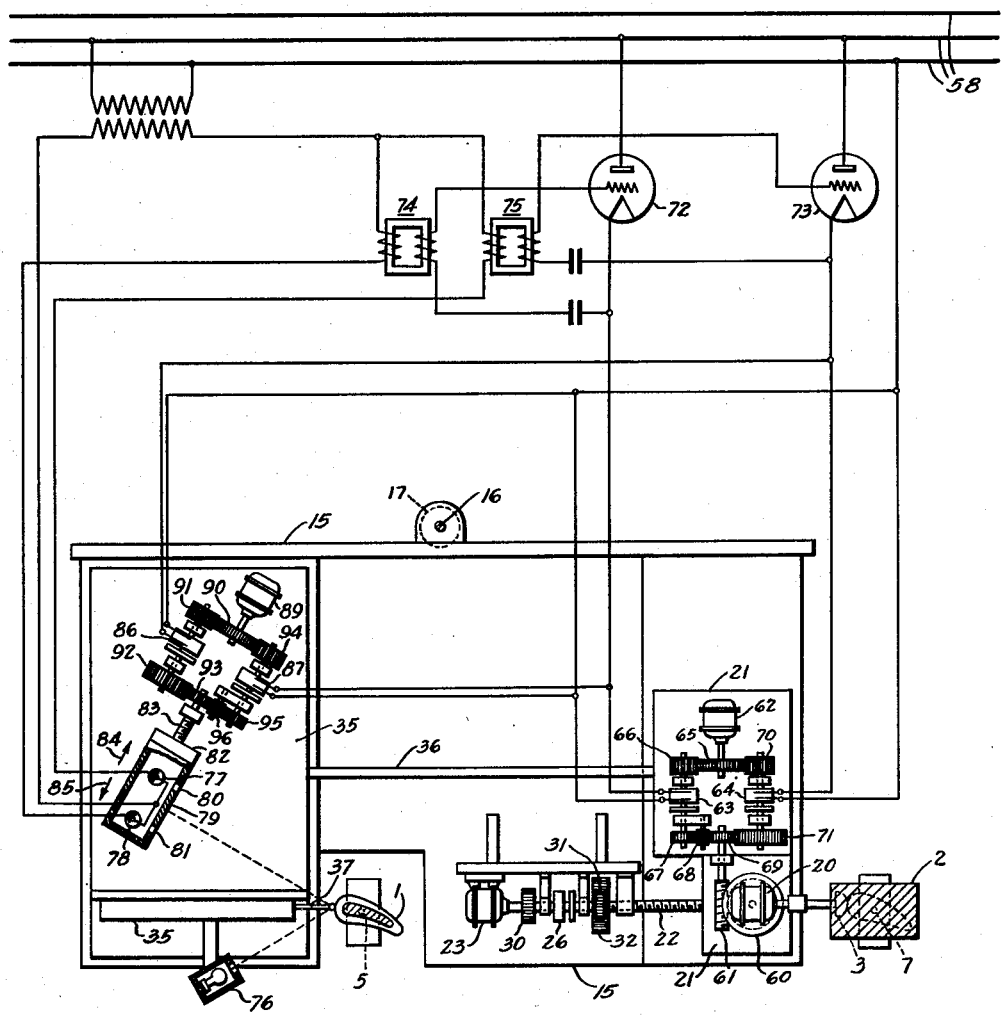

Other objects and advantages will become more apparent from a study of the following specification when considered in conjunction with the accompanying drawings, in which:

Figure 1 is a diagrammatic showing of the electric circuits comprising my system of control and also shows a side view of the mechanical features of my control and the machine being controlled; and Fig. 2 shows diagrammatically still further portions of my electric system of control, and in addition shows a plan view, looking in the direction indicated by the arrows at the end of the section line II—II, of the mechanical portions of my control and the machine being controlled.

The figures of the drawings show my invention as applied to one type of machine, but it is readily apparent that my invention has general utility and may be applied not only to a milling machine, but may be used with planers, grinders, cutters, lathes, etc. To bring out the novel features of my invention, and to simplify the discussion in the following specification, the description is confined to my system of control as applied to a milling machine.

To make certain that a machine, as suggested by the foregoing objects, operates satisfactorily, it is desirable to provide an automatically operating control which, for example, by regulating the driving device for the production of the rotational motion of the template body and the work-piece prevents the exceeding of a maximum permissible straining. This may be attained in a particularly suitable manner by controlling the driving device for the production of the rotational motion of the template body and the work piece in dependence upon the deflections of an electrical feeler. The control is to be so arrangd that as soon and as long as the feeler deflection manifests a predetermined maximum value in either one or the other direction, the template and the work piece are at rest.

If a roll or finger miller cutter is utilized as a tool, for example, it may be necessary, under certain circumstances, to attain accurate copying of the pattern, to provide a device which serves the purpose of always, at least approximately, maintaining the position of the axis of the tool perpendicular to the tangent of the contour to be produced in the working plane. This condition may, for example, be fulfilled by providing the machine with an auxiliary electrical feeler engaging the template which in a corresponding manner controls a motor for shifting the tool. The impulses for this control may be derived from the template in different ways. For example, a photo-electric feeler offers a simple possibility in this connection.

My apparatus will be more clearly understood by reference to the embodiment illustrated in the drawings. In Fig. 1 the template is identified by the numeral 1, the work-piece by 2, and the tool by 3. The template 1 and the work-piece 2 are mounted rotatably. In the embodiment they extend, for example, between pivots 4 and 5 and 6 and 7. The pivots 4 and 6 are provided with carriers or chucks so that when they rotate the bodies 1 and 2 rotate with them. To produce the rotational motion of bodies 1 and 2 a motor 8 serves which may be coupled to shaft 10 carrying at its end pivot 6 by means of an electrical coupling 9. In addition to the electromagnetic coupling 9, a rotating drive or reversing gear may be inserted if necessary, which serves the purpose of changing the direction of rotation of the pivot 6. The rotating drive may be dispensed with if the motor 8 is reversible.

On the shaft 10 a sprocket wheel 11 is mounted. On the shaft 12, which carries the pivot 4 at its end, a corresponding sprocket wheel 14 is mounted. The wheels 11 and 14 are coupled to each other by a sprocket chain 13 so that the template 1 and the work-piece 2 at all times rotate in step with each other.

The feeler device and the displacing device for the tool are mounted on a slider 15 which, with the aid of the spindle 16 and the motor 17, may be moved in the direction of the arrows 18 and 19. The motor 17 may be rotated in a direction corresponding to the desired transitional motion of the slider 15. If it is undesirable that the motor 17 be reversible, a rotating drive or reversing gear may be inserted between the motor 17 and the spindle 16.

The driving motor 20 for the tool 3 is mounted on a slider 21 which at the same time carries the thread for a spindle 22. The slider 21 may be moved in the direction of the arrows 24 and 25, by motor 23 operating spindle 22. The drive of motor 23 takes place over the gears 28, 29, 30, 31 and 32 or the gears 28, 33, 34 and 32 in dependence upon whether the electromagnetic coupling 26 or 27 is effective. Both electromagnetic couplings 26 and 27 are controlled by a feeler mounted on slide 35. The sliders 21 and 35 are in some manner, as by a connecting bar 36, connected with each other so that they carry out equal movements in the direction of the arrows 24 and 25.

The control of the electromagnetic couplings 26, 27 and 9 takes place by the operation of the feeler mounted on slider 35. The latter consists essentially of the feel lever formed of the parts 37 and 38. Part 38 carries at its terminal a contact piece 39. Opposite to this the contact members 40 and 41, which are secured to the levers 42 and 43, are disposed. These levers may pivot about pins 44 and 45 and support on their terminals contact members 46 and 47. When at rest, they are continuously maintained in a position in which the contact members 46 and 47 engage the contact member 50. A spring 51 provides for the maintenance of feeler lever 38 in its normal position in such a location that contact member 39 lies between contact members 40 and 41 without engaging either.

The control electromagnetic coupling 9, 26 and 27 takes place over the circuits including grid control tubes 52, 53 and 54, which in their turn, are controlled through the grid control transformers 55, 56 and 57 by the feeler.

The apparatus operates as follows: In the operating condition represented in the drawings, no current is transmitted through the couplings 26 and 27 while electromagnetic coupling 9 is excited. The motor 20 drives the milling tool 3; similarly, motors 23, 8 and 17 are in operation. Motor 17 moves the slider 15 rather slowly in the direction of arrow 18 while motor 8 more rapidly rotates the template and the work piece 2. Motor 23 rotates in this stage without moving slider 21.

If it is assumed that the feel lever 37 is moved towards the right by the rotating template 1, lever 38 pivots about pin 59 until contact member 39 engages contact member 41. If we now follow the circuit closed through contact members 39 and 41, we would recognize that current is supplied to the grid transformer 57. This circuit may be traced from the right-hand terminal 100 of the secondary 101 of transformer 102, through primary 103 of grid control transformer 57, conductor 104, contact members 41 and 39, and conductor 105 to the left-hand terminal of secondary 101. Energization of transformer 57 causes tube 54 to break down and tube 54 thus energizes magnetic coupling 27 by a circuit that may be traced from one phase of conductors 58, through tube 54, conductor 106, electromagnetic coupling 27, and conductor 107 to another phase of conductors 58.

The coupling 27 is thrown in and motor 23 moves slider 21 together with motor 20 and tool 3 towards the right. The result of this motion is that by the operation of bar 36, slider 35 is moved toward the right until the circuit between the contact members 39 and 41 is opened.

The events which take place when feel lever 37 moves towards the left by reason of the rotation of template 1 are similar; in this case, a circuit is closed through contact members 39 and 40 and through this by the operation of the grid transformer 56, tube 53 is brought into operation. Electromagnetic coupling 26 now becomes active and slider 21 together with motor 20 and with tool 3, move toward the left. This movement continues until slider 35 connected to slider 21 carries out a sufficient movement in the left-hand direction to again open the current connection between contact members 39 and 40.

In both cases, the tool 3 moves in a manner corresponding to the displacement of the feeler.

If the displacements of the feel levers are so large that the circuits through contact members 46, 50 and 47 are opened between the displacements of lever 42 or 43, grid transformer 55 is de-energized; tube 52 becomes non-conducting and the current supplied to electromagnetic coupling 9 which takes place through tube 52, is interrupted. Thereby, the template and the work-piece 2 are brought to rest, that is, stop rotating. Both elements remain at rest until the circuit is again closed through the contact members 46, 50 and 47. This takes place by movement of the slider 35 in one direction or the other according to whether a circuit is closed through contact members 39 and 40 or 39 and 41.

In Fig. 2 it is shown how a control may be established which provides for the continuous maintenance of the axis of rotation of the tool, accordingly here of the milling tool 3, in at least approximately the same relative position to the tangent of the contour to be produced in the working plane. Fig. 2 shows a plan view of the lower portion of the arrangement illustrated in Fig. 1. Here the template 1 and the work-piece 2 are illustrated in section and drive motor 20 and tool 3 are mounted on a turn-table 60 (compare also Fig. 1). The table 60 is provided with teeth on its periphery and may be rotated by a worm 61. The worm 61 receives its driving power from a motor 62. The driving takes place in accordance with the energization of the two electromagnetic couplings 63, or 64, and is active, either through the gears 65, 66, 67, 68 and 69 or through the gears 65, 70, 71 and 69. The couplings 63 and 64 are controlled through grid control tubes 72 and 73 through the paths including the grid control transformers 74 and 75 by the operation of photo-electric feelers or scanners represented in the left-hand portion of the drawings. The essential parts of the photo-electric feelers or tracers are a directional light source 76, both light responsive cells 77 and 78, and a screening wall 79 with openings 80 and 81. The calls 77 and 78 and the wall 79 are mounted on a member 82 which functions as the female for the spindle 83. By rotating the spindle 83 the parts 77, 78 and 79 may be moved either in the direction of the arrow 84 or arrow 85 without taking part in the rotational movement of the spindle 83. The motion is produced by motor 89 in accordance with the energization of the two electromagnetic couplings 86 and 87 and accordingly takes place through the gears 90, 94, 95, 96, and 93, for one direction of operation and through gears 90, 91, 92 and 93 for another direction of operation.

The embodiment illustrated in Fig. 2 operates as follows: As long as the beam of light from the source 76 reflects a beam of light from model 1 that falls on the screening disk 79 as shown the regulating device is at rest. If it is now assumed that the parts 1 and 2 rotate in such manner that the beam of light reflected from the template 1 falls on cell 78, the resistance of this cell decreases so that grid control transformer 74 passes current and controls the grid tube 72 in such manner that the electromagnetic coupling 63 passes current and becomes active. Accordingly motor 62 rotates turn-table 60. The table 60 would continue to rotate if we did not provide for so deflecting the reflected ray of light that it no longer impinges on the cell 78. Motor 89 performs the function of limiting the rotation of disk 60. At the instant that the electromagnetic coupling 63 receives current through tube 72, the electro-magnetic coupling 87 also becomes active since it also receives current from the same tube 72. The polarity of the control is so selected that at this instance motor 89 moves the light responsive device in the direction of arrow 85. As soon as cell 78 is by this motion removed from the range of the beam reflected by the template 1, the whole system comes to rest until by a further rotation of the template 1 sooner or later a new impulse is released.

The scanning of the template through the ray of light emitted by source 76 may be attained by moving the photo-electric scanner device along the template in proportion to the advancing copying as is the case with the mechanical scanner device. The arrangement may, however, be somewhat simplified by having the photo-electric scanner always scan the template at one and the same position of a mid cross-section. Such a position is indicated in Fig. 1 by the cross-hatching identified by the numeral 97. It is assumed for photo-electric scanning of templates as it is illustrated in Fig. 2 that the template has a surface that is capable of reflecting light to sufficient extent. The simplified photo-electric scanning of the template by scanning always in the same region 97 (Fig. 1) has the advantage that in case the template available is not sufficiently reflective, only a single portion of the template need be treated in such manner that it reflects sufficient light. In the simplest cases this may be attained by enclosing the portion of the template in the region of the scanning with a turn of a reflecting strip, or tape, or the like.

For the purpose of explaining the invention the structure and operation of an arrangement has been described above in which the thrust control towards the work-piece and away from the workpiece follows an electrical feeler or tracer which mechanically or photo-electrically coacts with the template 1. The applicability of the invention is in this respect not to be limited to the application of a mechanical feeler but photo-electric scanners or tracers may be used to advantage. Moreover the feel lever arrangement can have a different structure.

I claim as my invention:

1. In a system of control for a milling machine adapted to operate on a workpiece, in combination, a template, means for rotating the template and workpiece in unison, an electric tracer coacting with the template as it rotates, a milling tool, means for operating the tool, means for shifting the tool with reference to the workpiece, electronic means, controlled by said tracer, adapted to control the means for shifting the tool, and photo-electric means scanning said template for controlling certain elements of said tool shifting means to thus maintain the tool in a certain relation to the surface of the template at the scanning region of the template by said photo-electric means.

2. In a system of control for a machine operating on a workpiece, in combination, a tool, means for moving the tool in several ways which includes a rotary motion, a template, means coacting with the template for controlling the means for moving the tool, and further means also coacting with the template adapted to control the tool movements so that the axis of rotation of the tool is maintained in a certain relation to the surface of the template at the point of coaction of this last named means with the template.

3. In a system of control for a milling machine adapted to operate on a workpiece, in combination, a milling tool, means for rotating the milling tool, a body to be reproduced, means for rotating the body and workpiece in unison and about axes that have a fixed relation in space, tracer means coacting with the rotating body, means controlled by the tracer means adapted to move the milling tool toward and away from the axis of rotation of the workpiece to thus reproduce a finished piece having the contour of the body, and means for maintaining the axis of rotation of the milling tool in a given relation in space to a line tangent to the surface of the body at the region of the coaction of the tracer means with the body.

4. In a system of control for a tool operating machine adapted to operate on a workpiece that is to be made into a finished article, in combination, a finished article used as a pattern, an electric tracer coacting with the finished article, a tool, means for operating the tool to remove material from the work piece, electronic means having certain portions thereof controlled by said electric tracer, said certain portions of said electronic means being adapted to produce a modification of the operation of the means for operating the tool, and electronic tracer means for controlling certain other portions of said electronic means adapted to produce a further modification of the operation of the means for operating the tool, whereby the work piece will be shaped into a finished article.

5. In a system of control for a tool operating machine adapted to operate on a workpiece that is to be made into a finished article, in combination, a workpiece that is to be a finished article used as a guide, scanning means coacting with the finished article as a guide, a tool for removing material from the workpiece to shape it, and tool operating means, controlled by said scanning means so that said tool operating means moves the tool with reference to the workpiece to follow the guide provided by the finished article and to maintain the tool during such movement in a predetermined relation to a line normal to a plane tangent to the finished article at the region of coaction of the scanning means with the finished article.

6. In a system of control for a tool operating machine adapted to operate on a workpiece, in combination, a guide, a tool, means for operating the tool, and scanning means, coacting with the guide, adapted to control the operation of the means for operating the tool so that the tool is maintained in a definite relation to a line normal to the guide at the point scanned by said scanning means and moves to follow the guide.

7. In a system of control for a milling machine adapted to operate on a workpiece out of which a finished article is to be made, or the like, in combination, a model of a finished article, a tool disposed to operate on the workpiece to make a finished article therefrom, control means including means adapted to coact with said finished article in a predetermined angular relationship to the surface of the finished article at the region of coaction therewith and means adapted to coact with said finished article at a given position, and means, responsive to said control means, adapted to move the tool against the workpiece in response to the control effect produced by both the means included in the control means, namely, both as to position and angular relationship with reference to the region of coaction of the control means with the finished article.

8. In a system of control for a milling machine, or the like adapted to operate on a workpiece out of which a finished article is to be made, in combination, a motor for operating a finished article, a tool disposed to operate on the workpiece to make a finished article therefrom, control means adapted to coact with said finished article in a predetermined angular relationship to the surface of the finished article at the region of coaction therewith, means responsive to said control means adapted to move the tool against the workpiece in response to the control effect produced by the control means both as to position and angular relationship of the control means with reference to the region of coaction of the control means with a finished article and means also responsive to said control means for limiting the load that may be placed on the tool disposed to operate on the workpiece.

9. In a system of control for a tool operating machine adapted to operate on a workpiece, in combination, a guide, a tool, means for operating the tool, scanning means, coacting with the guide, adapted to control the operation of the means for operating the tool so that the tool is maintained in a definite relation to a line normal to the guide at the point scanned by said scanning means and moves to follow said guide, and means responsive to said scanning means for limiting the load on the means for operating the tool.

10. In a system of control for a tool operating machine adapted to operate on a workpiece that is to be changed into a finished article, in combination, a finished article used as a guide, scanning means coacting with the finished article as a guide, a tool for removing material from the workpiece to shape it, tool operating means, controlled by said scanning means so that said tool operating means moves the tool with reference to the workpiece to follow the guide provided by the finished article and to maintain the tool during such movement in a predetermined relation to a line normal to a plane tangent to the finished article at the region of coaction of the scanning means with the finished article, and means responsive to said scanning means for also controlling the tool operating means to limit the rate of the removal of the material from the workpiece by said tool.

11. In a system of control for a machine operating on a workpiece, in combination, a tool, means for moving the tool, a template, means coacting with the template for controlling the means for moving the tool further means also coacting with the template adapted to control the tool movements so that its axis maintains a certain relationship to the surface of the template at the point of coaction of this last named means with the template and means responsive to the first named means coacting with the template for limiting the load on the tool and thus the rate with which the tool removes material from the work piece.

12. In a system of control for a milling machine adapted to operate on a workpiece, in combination, a milling tool, means for rotating the milling tool, a body to be reproduced, means for rotating the body and workpiece in unison about axes that have a fixed relation in space, a tracer means coacting with the rotating body, means controlled by the tracer means adapted to stop the movement of the means for rotating the body and the workpiece and means controlled by the tracer means adapted to move the milling tool toward and away from the axis of rotation of the workpiece to thus reproduce a finished piece having the contour of the body.

13. In a system of control for a milling machine adapted to operate on a workpiece, in combination, a milling tool, means for rotating the milling tool, a body to be reproduced, means for rotating the body and work piece in unison about axes that have a fixed relation in space, a tracer means coacting with the rotating body, means controlled by the tracer means adapted to stop the movement of the means for rotating the body and the workpiece, means controlled by the tracer means adapted to move the milling tool toward and away from the axis of rotation of the workpiece to thus reproduce a finished piece having the contour of the body and means for maintaining the axis of rotation of the milling tool in a given relation in space to a line tangent to the surface of the body at the region of coaction of the tracer means with the body.

14. In a system of control for a milling machine adapted to operate on a workpiece, in combination, a template, means for rotating the template and workpiece in unison, an electric tracer coacting with the template as it rotates, a milling tool, means for rotating the tool, means for shifting the tool with reference to the workpiece, means responsive to the electric tracer adapted to stop the rotation of said template and workpiece if the tool is shifted with reference to the workpiece above a predetermined rate and electronic means controlled by said tracer adapted to control the means for shifting the tool.

15. In a system of control for a tool operating machine adapted to operate on a workpiece, in combination, a tool, a guide, means for shifting the tool, and electronic scanning means, coacting with the guide, adapted to control the means for shifting the tool so that the cutting edge of the tool will be maintained in a substantially fixed relation to a tangent at the point of contact of the cutting tool with the workpiece.

16. In a system of control for a cutting tool operating machine, in combination, a template having a scanning surface, photo-electric scanning means disposed to scan the scanning surface, a tool adapted to operate on a workpiece, and means, responsive to said photo-electric scanner, adapted to shift said tool so that a pair of given points on the tool will be maintained in a given relation to the template at the scanning surface.

17. In a system of control for a machine operating a cutting tool disposed to remove material from a workpiece, in combination, a cutting tool, means for shifting the tool with reference to the workpiece, a guide having contours indicative of the contours the finished workpiece is to have, electric tracer means coacting with the guide and responsive to changes in angular relation of the surface of the guide to the tracer means adapted to control the movement of the means for shifting the tool.

18. In a system of control for a machine for shaping workpieces in a desired manner, said machine having a cutting tool, a support therefor adapted to be moved angularly and in any direction for any selected plane of operation, in combination, an outline pattern, a source of radiant energy, means for causing a pencil of radiation to fall on said outline pattern, radiation responsive means disposed to be affected by a change in angular relation of the outline pattern at the point illuminated with reference to said source of radiant energy, means responsive to said radiation responsive means adapted to control the movement of the support for the tool so as to move it about a pivot in its plane of operation, and control means adapted to control the translational movements of the tool support in its plane of operation.

WILHELM CHLADEK.